Feb. 1, 1955 V. A. SMITH 2,701,060
ROTARY FORMATION GRADER AND CLEANER
Filed April 11, 1951 2 Sheets-Sheet 1
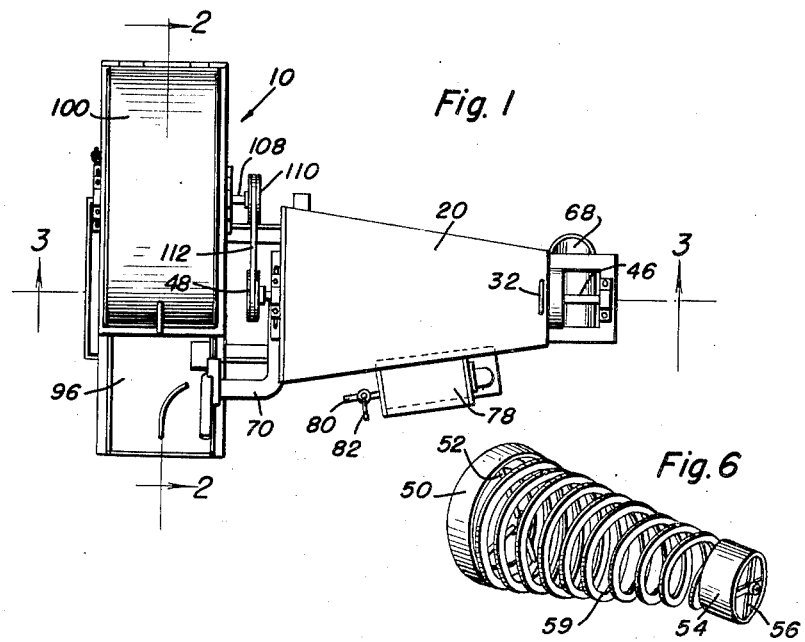
Fig. 1
Fig. 6
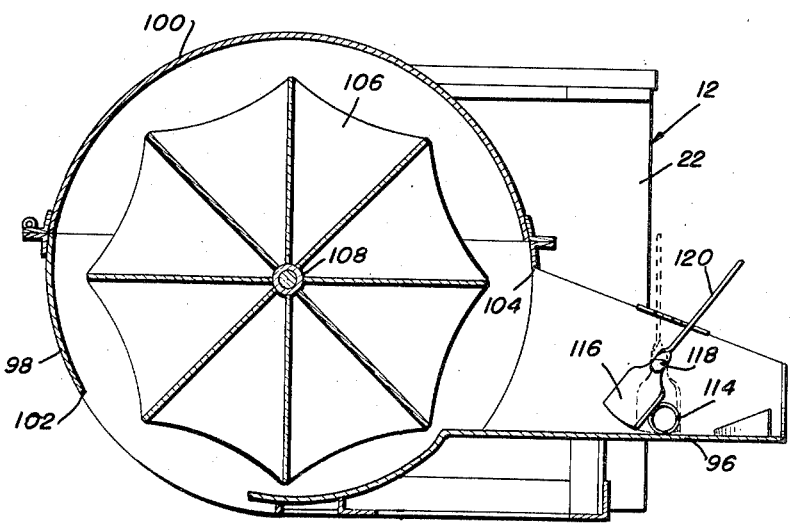
Fig. 2
Victor A. Smith
INVENTOR.
BY *Clarence A. O'Brien*
*and Harvey B. Jacobson*
Attorneys Feb. 1, 1955
V. A. SMITH
2,701,060
ROTARY FORMATION GRADER AND CLEANER
Filed April 11, 1951
2 Sheets-Sheet 2
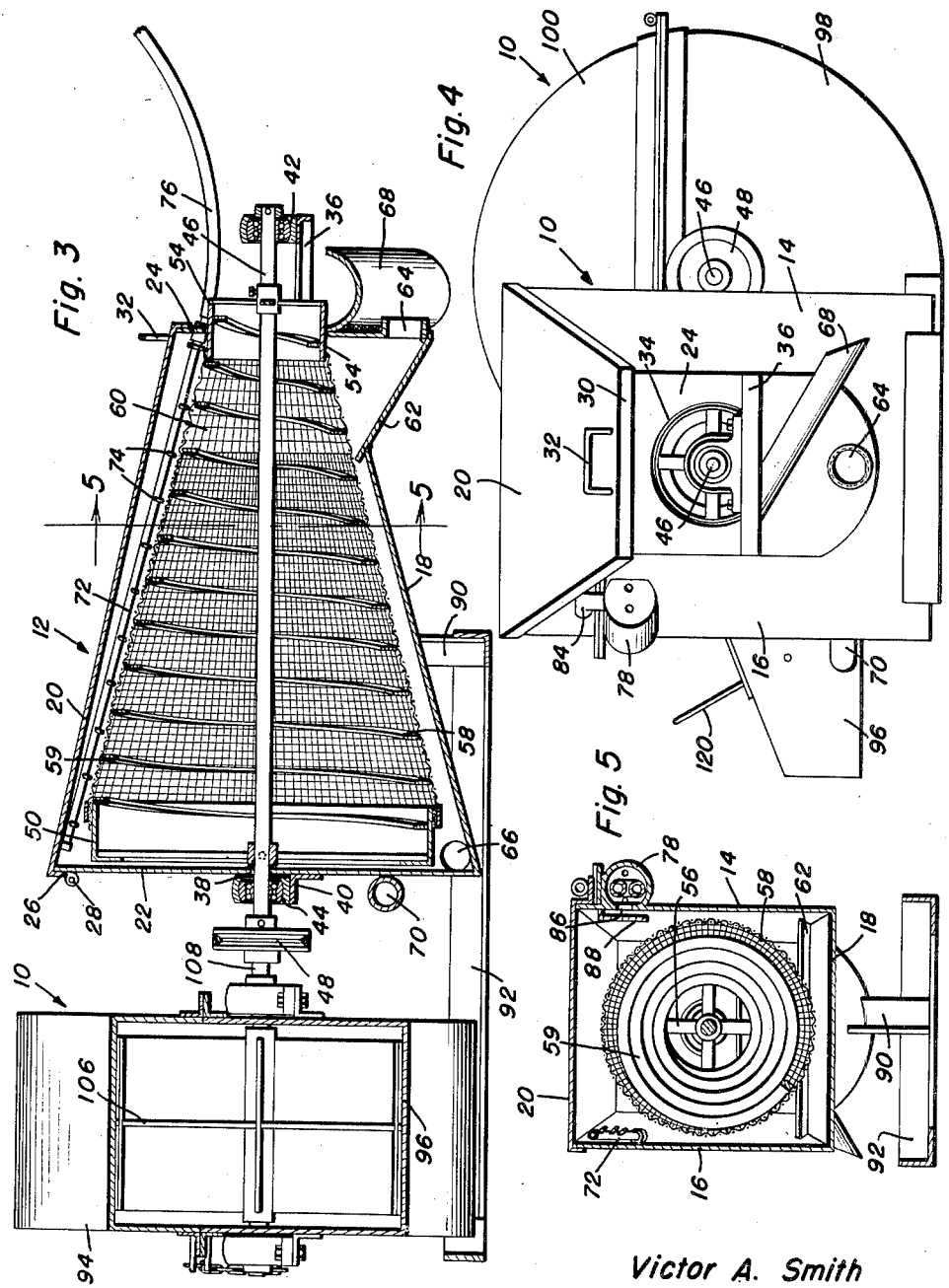
Victor A. Smith
INVENTOR.
BY United States Patent Office 2,701,060
Patented Feb. 1, 1955

2,701,060

ROTARY FORMATION GRADER AND CLEANER

Victor A. Smith, Plainville, Kans.

Application April 11, 1951, Serial No. 220,393

5 Claims. (Cl. 209—290)

This invention comprises novel and useful improvements in a rotary formation grader and cleaner and more specifically pertains to a rotary grading and sorting device adapted to be operated and rotated by the pressure of the circulating and drilling mud of drilling rigs for removing particles of different formations encountered in the drilling operations below the earth's surface.

The primary object of this invention is to provide an apparatus which shall be capable of separating and sorting the different sized particles from various geological strata and formations encountered in drilling operations beneath the earth's surface and which have been withdrawn from the drilling bore by the drilling mud normally circulated during the drilling operation.

A further object of the invention is to provide an apparatus in conformity with the preceding object which shall be capable of classifying and sorting the particles according to size and discharging them separately from the apparatus; shall be capable of separating and removing cotton hulls which are commonly mixed with the drilling mud; and which shall be highly efficient for the purposes intended.

Yet another object of the invention is to provide a rotary grading and sorting apparatus which shall be capable of sorting different sized particles entrained in the drilling mud from subterranean drilling formations; shall be capable of effectively cleansing the particles prior to their withdrawal from the apparatus; and shall be capable of functioning effectively in extremely cold weather.

Yet another important object of the present invention is to provide an apparatus of an extremely simplified construction, having an improved casing and housing means permitting ready access to the interior of the device and functioning to facilitate the separation of the solid particles of formation entrained in the drilling mud.

A still further important object of the invention is to provide a rotary separator in conformity with the above mentioned objects which shall be operated and rotated by the pressure of the drilling mud as discharged from the drilling rig; and wherein the mud from the drilling rig may be controllably divided between flow to the rotating means of the apparatus and into the rotary grader and cleaner of the apparatus.

These, together with various ancillary features and objects of the invention, which will later become apparent as the following description proceeds, are attained by the present invention, a preferred embodiment of which has been illustrated, by way of example only, in the accompanying drawing, wherein:

Figure 1 is a top plan view of a preferred embodiment of apparatus conforming to the principles of this invention;

Figure 2 is a vertical transverse sectional view, taken upon an enlarged scale substantially upon the plane indicated by the section line 2—2 of Figure 1, and showing the internal construction of the means for supplying drilling mud to the device, the turbine rotor constituting the propelling means of the rotary grader, and a valve for proportioning flow of the mud to the turbine and to the grader;

Figure 3 is a horizontal sectional view, taken upon an enlarged scale, substantially upon the plane indicated by the section line 3—3 of Figure 1 and showing details of the internal construction of the device;

Figure 4 is an end view taken from the right end of Figure 3 and showing the discharge end of the apparatus;

Figure 5 is a vertical transverse sectional view taken substantially upon the plane indicated by the section line 5—5 of Figure 3; and Figure 6 is a perspective view showing certain structural features of a portion of the grading rotor of the device.

Referring now more specifically to the accompanying drawings, wherein like numerals designate similar parts throughout the various views, it will be seen that the apparatus embodying therein the principles of this invention consists of a prime mover or source of power, indicated generally by the numeral 10, which is operatively connected with a rotary grader, sorter and cleaner indicated generally by the numeral 12.

While it will be understood that any desired type of prime mover or source of motive power may be employed for imparting rotation to the rotary element of the grader and sorter, in order to utilize and realize the benefits and advantages of the particular rotary grader, it is preferred to utilize the turbine type of prime mover indicated in Figures 2 and 3 of the drawings in the particular association set forth with the particular rotary grader.

Referring first more particularly to Figures 3, 4 and 5, it will be seen that the rotary grader 12 consists of a frusto-pyramidal casing consisting of a pair of parallel side walls 14 and 16, an inclined bottom wall 18 and an inclined top or cover 20 in conjunction with a rear wall 22 and a front wall 24. As will be readily seen, the casing constitutes a frustrum of a four-sided pyramid, the wall 24 constituting the smaller base thereof while the wall 22 constitutes the larger base. Each of the walls 14, 16, 18 and 20 is thus of a trapezoidal shape, as will be apparent from Figures 1 and 4.

The cover 20 has a downturned depending flange 26 at its rear end which overlaps and is hingedly connected at 28 to the upper portion of the larger or rear wall 22, while the front end of the cover has a depending flange 30 adapted to overlap the upper edge of the front wall 24 as indicated in Figures 3 and 4.

A handle 32 constitutes means whereby the downwardly sloping cover may be raised or lowered as desired in order to selectively enclose the internal mechanism of the grader or obtain access to the same as desired.

The walls of the casing may be made of any convenient material, such as sheet metal or the like.

The front wall 24 is provided with a circular centrally disposed aperture 34 and with a forwardly extending supporting platform 36. Similarly, the rear wall 22 is provided with an aperture 38 disposed in axial alignment with the aperture 34, and with a supporting bracket or shelf 40 extending rearwardly of the rear wall.

Bearing assemblies 42 and 44 of any conventional design are mounted respectively upon the supporting platforms or brackets 36 and 40 and serve to rotatably journal a shaft 46.

Upon its rear end, the shaft is provided with a pulley 48 which may be operated by any desired type of prime mover, but preferably by the prime mover 10 in a manner set forth hereinafter.

Fixedly secured upon the shaft 46 for rotation therewith is a rotor constituting the grader and sorter of this invention. This rotor, as shown in Figure 6, comprises a relatively large annular band or rim 50, having axial spokes 52 by means of which the rim is fixedly secured as by a set screw, pin or the like to the shaft 46 adjacent but inside the rear wall 22. At its other end, the rotor includes a similar but smaller metallic band or rim 54 having the radial spokes 56 by means of which the same is secured to the front end of the shaft 46. However, the rotor is so proportioned that one extremity of the rim 54 extends through the aperture in the front wall for a rotating sliding fit therein, upon rotation of the shaft.

A flat metallic strip spiral auger 58 has its larger end seated within and fixedly secured to the larger rim 50, and its smaller end similarly secured in the smaller rim 54. The two rims, together with the spiral auger thus provide a conical rotor about which is fixedly secured a foraminous, reticulated or perforate sheet of material preferably comprising a close meshed screen 59 extending from and secured to the larger rim 50, and a coarser meshed screen or sieve 60 fixedly secured to the smaller rim 54 and overlapping the adjacent end of the closer meshed screen.

The two screens thus provide a conical perforate sheet of material which is supported upon the auger 58 which thus serves to impart rigidity or stiffness to the screen, as well as constituting a means for causing travel of material from the large end to the small end of the conical rotor as set forth hereinafter.

The rotor is centrally mounted with respect to the casing and, as shown clearly in Figure 3, has its lower portion disposed above although in close relationship to the bottom slanting wall 18 thereof. This bottom wall, adjacent its uppermost end, is provided with a downwardly extending portion 62 comprising a pocket which has an outlet port 64. The pocket 62 underlies the coarser meshed portion 60 of the rotor and is intended to collect material passing through the coarser mesh of the screen and discharge this material through the port 64 to any suitable collecting means such as a conduit or the like.

The inclined bottom wall 18, extending between the two ends of the finer meshed screen 59, constitutes a sloping collector of material passing through the fine meshes of the screen, for discharging the same through a discharge conduit 66 disposed at the lowermost end of the bottom wall 18 and at its end at its junction with the rear wall 22.

At its front wall, the sorter is provided with a discharge chute 68 which underlies the open end of the smaller rim 54 for collecting material passing across the coarser screen 60 and out of the open end of the rim 54.

An inlet conduit 70 is provided and extends through the rear wall 22 and into the interior of the larger rim 50 for discharging drilling mud containing particles of subterranean formations into the larger and lower end of the conical rotor. The particle laden mud thus discharged is caused to travel axially and upwardly through the conical rotor by virtue of the spiral vanes of the auger 58. During this upward travel, the finer particles drop through the mesh 59 and descend along the sloping bottom 18 to be collected and discharged through the discharge conduit 66 for the finer particles. The larger particles pass upwardly across both of the screens and are discharged through the open end of the end rim 54 into the chute 68 where these are collected for examination. The intermediate sized particles passing upwardly over the fine screen 59 are discharged through the larger screen 60 into the pocket 62 and from thence to the discharge port 64 where they are segregated and in turn stored for examination.

In order to cleanse the particles during their travel through the separator and also to wash away the mud carrier of the particles, a spray means is provided consisting of a pipe 72 having spray or discharge nozzles 74 thereon directed toward the conical rotor. As shown best in Figures 3 and 5, this pipe may be mounted upon the side wall 16 adjacent the upper end of the same and immediately below the cover 20 whereby easy access may be had to the same for servicing. At its lower end, the pipe extends through the front wall and may be provided with a removable hose 76 by means of which water under pressure may be supplied to the spray pipe.

In order to prevent freezing of the spray pipe and of the material handled by the rotary grader, in cold weather, a heating means is provided consisting of a casing 78 attached to the exterior of one of the side walls 14 and which may conveniently be supplied with a gaseous or liquid combustible as by a pipe or conduit 80, see Figure 1, under the control of a manual valve 82. The casing 78 thus constitutes a combustion chamber provided with a vent 84 and discharges its products of combustion as by a port 86 into the interior of the cylinder 12 behind a depending baffle 88. Thus, the interior of the sorter is supplied with heated gases to prevent freezing of the screen, the material passing therethrough and the water of the water spray.

At any convenient point along its length, the casing of the sorter 12 may be supported as by an angle iron standard 90 in a pan or tray 92. Conveniently, this pan or tray may likewise receive the prime mover or source of power 10.

Referring now more particularly to Figures 1, 2 and 4, it will be seen that the prime mover 10 comprises a cylindrical or drum-like casing 94 having a radially extending inlet chamber 96 communicating therewith.

This casing, as shown more clearly in Figure 2, may have a stationary bottom section 98 and a complementary top section 100 hingedly or removably secured thereto. The bottom section 98 is provided with a discharge port 102 and with an inlet port 104 communicating with the inlet conduit 96.

Rotatably journaled in any suitable manner within the casing 94 is a turbine rotor indicated generally by the numeral 106 which may be of any convenient construction. It is contemplated that drilling mud, supplied under pressure from the drilling rig after the mud has been circulated through the well 4, shall be supplied into the conduit 96 and contents will pass outwardly through the discharge port 102, causing rotation of the turbine rotor 106 during this passage. The rotor 106 is mounted upon a turbine shaft 108, provided as shown in Figure 1 with a pulley 110 which is coupled as by a belt 112 with the pulley 48 upon the shaft 46 of the rotary grader.

Thus, the pressure of the drilling mud as discharged from the drilled well casing is utilized to impart rotation to the rotary grader and sorter.

However, the conduit 96 also serves as a means to controllably supply this drilling mud, which is laden with solid particles from the various subterranean formations through which the drilling operation has progressed, to the rotor of the grader. For this purpose, the supply conduit 70 of the grader extends through the wall of the supply conduit 96, having an inlet port 114 therein. A slide valve 116 in the form of a plate is pivoted, as at 118, to a side wall of the supply duct 96, and has an actuating handle 120 extending through a suitable slot in the side wall. This handle permits the control valve 116 to be regulated to completely close the port 114 or adjustably control and throttle the same to thereby accurately control the rate of flow of the mud from the duct 96 into the sorter.

It will thus be apparent that the prime mover unit drives the rotary grader from pressure derived from the drilling mud, and also serves as a source of supply for delivering this mud to the sorter for cleansing, grading and removing solid particles therefrom.

It will thus be apparent that this invention provides an apparatus which may be operated from no exterior source of power other than the pressure inherent in the drilling mud as discharged from the drilling mud circulating system of the well; cleanses this mud and separates from it the solid particles carried by the mud from the various subterranean formations through which the drilling has progressed; cleanses, separates and discharges these solid particles where they may be separately analyzed and examined to determine the character of the formation through which the drilling is progressing, and also to recover cotton hulls which are customarily mixed with the drilling mud.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

Having described the invention, what is claimed as new is:

1. A rotary formation grader and cleaner comprising an elongated rotor journaled for rotation about a horizontal axis, driving means for rotating said rotor, said driving means comprising a turbine connected to the rotor and having an intake for the induction of drilling mud under pressure, means for supplying mud laden with formation particles to one end of said rotor, said last means being connected to the intake of the turbine, said rotor including means causing travel of the particle laden mud axially of said rotor, said rotor having an open end opposite said one end and having a sheet of porous material disposed peripherally thereof, said material being of different porosity at one end of the rotor than at the other end whereby particle laden mud will be graded as it passes over said material in its passage axially of the rotor and coarse particles will be discharged axially of said open end.

2. A rotary formation grader and cleaner comprising an elongated rotor journaled for rotation about a horizontal axis, driving means for rotating said rotor, said driving means comprising a turbine connected to the rotor and having an intake for the induction of drilling mud under pressure, means for supplying mud laden with formation particles to one end of said rotor, said last means being connected to the intake of the turbine, said rotor including means causing travel of the particle laden mud axially of said rotor, said rotor having an open end opposite said one end and having a sheet of porous material disposed peripherally thereof, said material being of different porosity at one end of the rotor than at the other end whereby particle laden mud will be graded as it passes over said material in its passage axially of the rotor and coarse particles will be discharged axially of said open end, means for regulating the flow of mud from said turbine intake to said means supplying mud.

3. The combination of claim 1 including a casing for said rotor, said casing including a bottom wall having a sloping portion beneath one end of the rotor and an oppositely sloping portion beneath the other end of the rotor whereby the graded mud will be separated.

4. The combination of claim 1 including means for spraying water upon and through said rotor.

5. The combination of claim 1 including means for spraying water upon and through said rotor, means for heating said rotor and water spraying means.

References Cited in the file of this patent

UNITED STATES PATENTS

| | | |
|---|---|---|
| 34,645 | Read | Mar. 11, 1862 |
| 92,327 | Loeffel | July 6, 1869 |
| 148,442 | Gidley | Mar. 10, 1874 |
| 211,893 | Duhem | Feb. 4, 1879 |
| 300,715 | Leas et al. | June 17, 1884 |
| 615,667 | Barnett | Dec. 13, 1898 |
| 842,614 | Blass | Jan. 29, 1907 |
| 1,424,032 | Pickering | July 25, 1922 |
| 1,473,454 | Albano | Nov. 6, 1923 |
| 1,666,370 | Detwiler | Apr. 17, 1928 |
| 1,840,289 | Hunter | Jan. 5, 1932 |
| 2,174,836 | Range | Oct. 3, 1939 |

FOREIGN PATENTS

| | | |
|---|---|---|
| 285,518 | Great Britain | Feb. 23, 1928 |

OTHER REFERENCES

Ceramic Bulletin, vol. 20, No. 1 (1950), pages 27–29. Copy in Scientific Library.